US012595872B2

(12) United States Patent
Skjevik et al.

(10) Patent No.: US 12,595,872 B2
(45) Date of Patent: Apr. 7, 2026

(54) TUBULAR END PROTECTOR

(71) Applicant: BEWI ENERGY AS, Hamarvik (NO)

(72) Inventors: Geir Skjevik, Trondheim (NO);
Michael Skjold, Hamarvik (NO)

(73) Assignee: BEWI ENERGY AS, Hamarvik (NO)

( * ) Notice: Subject to any disclaimer, the term of this patent is extended or adjusted under 35 U.S.C. 154(b) by 555 days.

(21) Appl. No.: 18/002,381

(22) PCT Filed: Jun. 21, 2021

(86) PCT No.: PCT/EP2021/066870
§ 371 (c)(1),
(2) Date: Dec. 19, 2022

(87) PCT Pub. No.: WO2021/255298
PCT Pub. Date: Dec. 23, 2021

(65) Prior Publication Data
US 2023/0332727 A1 Oct. 19, 2023

(30) Foreign Application Priority Data
Jun. 19, 2020 (GB) ..................................... 2009429

(51) Int. Cl.
*F16L 57/00* (2006.01)
*F16L 55/115* (2006.01)

(52) U.S. Cl.
CPC ......... *F16L 57/005* (2013.01); *F16L 55/1155* (2013.01)

(58) Field of Classification Search
CPC ............................ F16L 55/1155; F16L 57/005
See application file for complete search history.

(56) References Cited

U.S. PATENT DOCUMENTS 1,785,985 A * 12/1930 Shrum ................... B65D 59/02
138/96 T
RE18,184 E * 9/1931 Brown et al. .......... B65D 59/02
138/96 T
(Continued)

FOREIGN PATENT DOCUMENTS

CN 101592280 A 12/2009
CN 204099813 U 1/2015
(Continued)

OTHER PUBLICATIONS

International Search Report and Written Opinion for Related Application No. PCT/EP2021/066870 dated Sep. 13, 2021 (15 pages).
(Continued)

*Primary Examiner* — David R Deal
(74) *Attorney, Agent, or Firm* — Michael Best & Friedrich LLP

(57) ABSTRACT

A protector is proposed for an end of an elongate member, such as an end of a pipe or tube. The protector comprises a rigid portion which has a body portion for insertion into a cavity defined by an end portion of the elongate member, and a cover portion extending from the body portion. The protector further comprises a flexible portion provided on an outer surface of the body portion. The flexible portion comprises one or more resilient members. When the body portion is received within the cavity of the elongate member, the resilient members engage the inner surface of the cavity, and the cover portion covers an end surface of the elongate member.

15 Claims, 11 Drawing Sheets

(56)                References Cited

U.S. PATENT DOCUMENTS

| | | | | |
|---|---|---|---|---|
| 1,906,093 | A | * | 4/1933 | Ponce .................... B65D 59/06 |
| | | | | 138/96 T |
| 1,980,364 | A | * | 11/1934 | Thomas ................ B65D 59/02 |
| | | | | 138/96 R |
| 2,013,254 | A | * | 9/1935 | Riney .................... B65D 59/02 |
| | | | | 220/803 |
| 2,215,251 | A | * | 9/1940 | Prince ................. E21B 17/006 |
| | | | | 138/96 T |
| 4,553,567 | A | * | 11/1985 | Telander ................ B65D 59/02 |
| | | | | 138/96 T |
| 5,454,479 | A | | 10/1995 | Kraus |
| 5,803,126 | A | | 9/1998 | Zaro |
| 5,893,480 | A | | 4/1999 | Dore et al. |
| 6,116,286 | A | | 9/2000 | Hooper et al. |
| 7,066,209 | B2 | * | 6/2006 | Imai ...................... B65D 59/06 |
| | | | | 285/333 |
| 9,546,029 | B1 | | 1/2017 | Keevert |
| 2002/0079652 | A1 | | 6/2002 | Nicolia et al. |
| 2008/0236691 | A1 | | 10/2008 | Roll |
| 2008/0310914 | A1 | | 12/2008 | Salas |
| 2017/0030504 | A1 | | 2/2017 | Robillard |

FOREIGN PATENT DOCUMENTS

| | | |
|---|---|---|
| CN | 110966479 A | 4/2020 |
| CN | 210566962 U | 5/2020 |
| WO | 2019231322 A1 | 12/2019 |
| WO | 2020095016 A2 | 5/2020 |
| WO | 2020150052 A1 | 7/2020 |

OTHER PUBLICATIONS

United Kingdom Intellectual Property Office Action for Related Application No. GB 2009429.8 dated Nov. 11, 2020 (5 pages).
United Kingdom Intellectual Property Office Action for Related Application No. GB 2009429.8 dated Aug. 3, 2021 (3 pages).
International Preliminary Report on Patentability for Related Application No. PCT/EP2021/066870 dated Dec. 13, 2022 (10 pages).

* cited by examiner

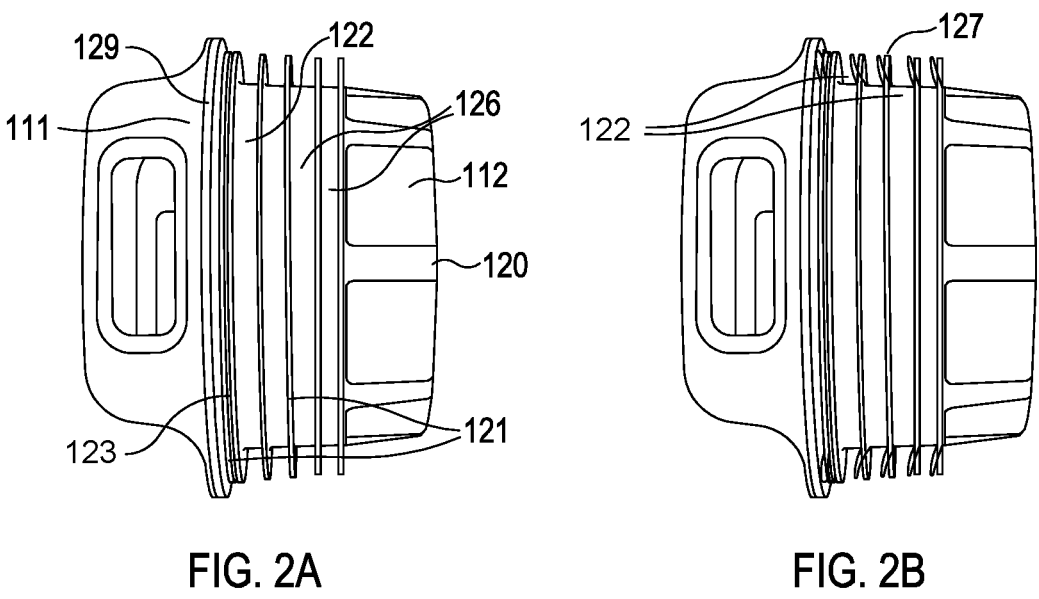
FIG. 2A                    FIG. 2B
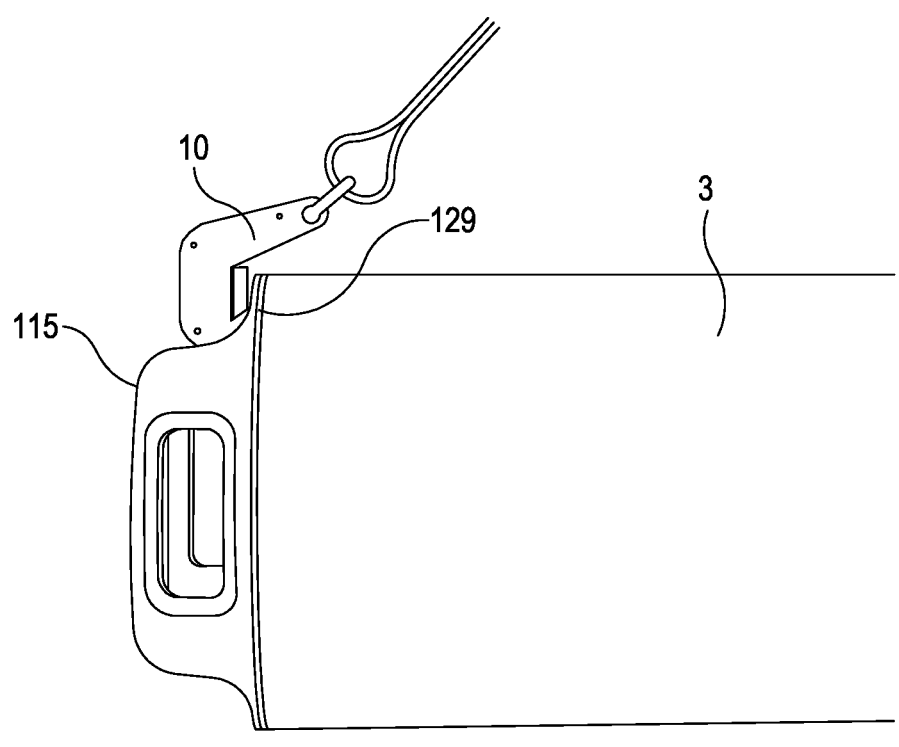
FIG. 3

326          327          312

TUBULAR END PROTECTOR

CROSS REFERENCE TO RELATED APPLICATIONS

This application is a U.S. National Phase of PCT/EP2021/066870 filed Jun. 21, 2021, which claims priority to Great Britain Application No. 2009429.8, filed Jun. 19, 2020, the entire contents of both of which are herein incorporated by reference.

FIELD OF THE INVENTION

The present invention relates to protectors for the ends of elongate members, and particularly to protectors for the ends of pipes which are not provided with a screw thread, such as pipes used in midstream operations in the oil and gas industry, or in chemical or power plants. In particular, the protectors are adaptable for use with elongate members having any size within a predetermined range which encompasses multiple nominal diameters.

BACKGROUND OF THE INVENTION

A key aspect of the oil and gas industry is the 'midstream' transportation of crude or refined petroleum products, for example between a production site and a refinery, or between a refinery and distributors. Midstream transportation may take place via pipelines. Pipes used in midstream transportation are often non-threaded, and are welded rather than screwed together.

Such non-threaded pipes may also be used in geothermal wells, chemical plants, pipelines for water, oil, and gas, power plants, and the nuclear industry.

It is important for pipes used in midstream operations to be highly reliable; faults within a string of pipes can cause serious problems, both for the mechanical operation of the associated machinery (with related financial costs) and for the environment. Accordingly, it is essential to protect pipes during storage and transportation of the pipes. Wear generated in storage or transit is particularly undesirable as it decreases the lifetime of the pipe.

In particular, the inner and outer surfaces of the pipes must be protected against mechanical damage. Protection is also required to prevent debris from entering the pipe, and to enable the environment inside the pipe to be controlled, especially during long-term storage.

Protectors for such pipes are known. Conventionally, these protectors are formed as a single piece of rigid material having the shape of a recessed cap. In use, the recessed cap is clamped over the rim of the pipe.

A problem with such protectors is their high failure rate. These protectors frequently detach from pipes during transportation, handling, and storage, thereby exposing the pipe to wear and allowing debris and moisture to enter the pipe. Additionally, the seal created between the pipe and the protector may be imperfect, allowing material to enter the pipe even if the protector does not become detached during use.

Another problem is the level of inefficiency associated with the use of such protectors. Typically, these protectors are treated as waste after use, and are discarded accordingly. The use of such protectors therefore generates a large quantity of waste material.

SUMMARY OF THE INVENTION

It is an object of the present invention to provide new and useful protectors for an end of elongate objects, for example for the ends of pipes.

In general terms, a first aspect of the invention proposes a protector for the end of an at least partially hollow elongate member, such as a non-threaded pipe. The protector comprises a rigid portion formed from a first material having a first elastic modulus. The rigid portion comprises a body portion for insertion in an axial direction into a cavity defined by an end portion of the elongate member, and a cover portion extending from the body portion. The protector further comprises a flexible portion which is formed from a second material having a second elastic modulus and provided on an outer surface of the body portion, the second elastic modulus being smaller than the first elastic modulus. That is, for a given unit volume, the rigid portion is more resistant to deformation than the flexible portion. The flexible portion has one or more resilient members, the resilient members comprising one or more first flexible ridges. The flexible ridges may have substantially constant radial extent (height relative to the axis) along at least a portion of their length.

It has been found that using a protector of this kind gives a high degree of protection (e.g. with a low risk of the protector becoming separated from the pipe) while allowing the protector to be attached to the pipe with relatively low mechanical force. Thus, the attachment operation may be carried out manually. Further, the protector may be subsequently detached from the elongate member, and re-attached to another elongate member. Thus, it is re-usable to successively protect multiple elongate members, leading to a more environmentally-friendly protector than known single-use protectors.

The protector may have an axis for axial insertion into the elongate member, and each first ridge may extend radially outward from the rigid portion. The cover portion may be part of the rigid portion of the protector. That is, it may also be formed from the first material, and may be part of a contiguous body of the first material which includes also the body portion. It may also extend radially outward from the rigid portion.

Optionally, there are a plurality of first flexible ridges, and each first ridge has a maximum distance from the axis (i.e. radial extent, or "height") which may be substantially the same as that of each other first ridge. Each first ridge may have a substantially constant radial extent along the majority of its length, or even substantially all its length. The portion of the first ridge having substantially constant radial extent may extend around the whole circumference of the central axis. For example, the portion of each first ridge may have a radially-outer edge (in other words, a position on the surface of the ridge where the distance of the surface to the axis is locally maximal in an axial plane (i.e. a plane normal to the axis); such an edge is typically not in contact with the body portion and is referred to here as a "free edge") which is circular (with the axis as the center of the circle) or which is parallel to the axis. Optionally, this edge may be the portion of the first ridge which is furthermost from the body portion. The edge is preferably at the same distance from the axis of the body portion at all positions along at least a portion of the edge, and optionally along the whole of the edge of each first ridge.

The flexible portion is preferably, but not necessarily, contiguous (i.e. a single contiguous portion of the second material includes multiple ones of the resilient members).

When the body portion of the protector is received within a cavity of an elongate member, the resilient members engage the inner surface of the cavity, and the cover portion covers an end surface of the elongate member. The resilient members may be reliantly urged against the inner surface of the elongate member, and/or be secured to the inner surface of the cavity by frictional forces.

This may provide any of several advantages. The protector may be secured to an elongate member by means of friction and/or deformation alone, obviating the need for a thread pattern to be provided on an inner or outer surface of the elongate member, or on a surface of the protector. Accordingly, the protector may be used in conjunction with an elongate member such as a pipe without requiring a thread pattern of the protector to match a thread pattern of the pipe. Furthermore, the protector is compatible with non-threaded pipes, such as those used in midstream operations. The protector may also be easier for a user to apply, since there is no need to keep two thread patterns in register when applying the protector to an elongate member.

The protector may define a first axial direction ("forward") along its axis from the cover portion to the body portion, and a second axial direction ("rearward") along its axis from the body portion to the cover portion. The rigid cover portion may at least partially protect the elongate member from external damage.

The flexible portion may serve to absorb at least part of any impact sustained by the protector. Additionally, the flexible portion may reduce the force required to apply the protector to a pipe, and thus increase the ease of application of the protector for a user.

The resilient members may secure the protector to the elongate member by means of a friction fit and/or deformation fit, thereby reducing the likelihood of the protector detaching from the elongate member during use. In some embodiments, the resilient members may be sufficiently flexible that the protector is compatible with pipes having a range of inner diameters (IDs) and outer diameters (IDs).

One or more of the resilient members may act as a seal, to prevent fluid flow along an axial direction of the protector. Hence, moisture and debris can be prevented from entering the cavity of the pipe, and the internal environment of the pipe may be controlled, even during long-term storage of the pipe and protector.

Each first ridge may take any shape (e.g. its cross-section transverse to a length direction of the ridges may be triangular or semi-circular). The plurality of first ridges may be adjacent to each other on the flexible portion, or they may be spaced-apart. Each first ridge may have a constant cross-section along some or all of their length.

The protector may define a central axis surrounded by each of the rigid portion and flexible portion, and each first ridge may encircle the central axis. Optionally, each first ridge may be non-helical—for example, each first ridge may be circular, or may extend parallel to the central axis of the protector.

The protector may be circularly symmetric about the central axis.

The plurality of first ridges may be provided spaced apart along an axial direction of the body portion between a first end and a second end of the body portion. A spacing between adjacent first ridges at the first end of the body portion may be greater than a spacing between adjacent first ridges at the second end of the body portion. As the body portion is inserted into the cavity, the first ridges may deform in the axial direction to engage with the inner surface of the cavity. The force developed between them (i.e. between the first ridges and the inner surface of the cavity) is substantially due to resilience of the first ridges, and depends upon the second elastic modulus. Optionally, the flexible portion may comprise a flexible member provided on or adjacent to a surface of the cover portion for providing a cushion between the cover portion and the end of the elongate member, such that the flexible member lies against an end surface of the elongate member (e.g. a rim of the pipe) when the body portion is inserted in the cavity, thereby protecting the end surface from damage and enhancing the sealing properties of the protector. The flexible member may be formed from the second material.

The protector may further comprise a valve which allows gas within the elongate member to pass to the ambient atmosphere (i.e. a region outside the elongate member and the protector) but impeded gas flow in the opposite direction. This allows gas (air) within the elongate member to escape when the body portion of the protector is inserted into the elongate member, but makes it harder to withdraw the body portion from the elongate member.

For example, the valve may be a check valve, such as a one-way flapper valve. The check valve may be switched between a first configuration and a second configuration by a valve actuator, wherein in a first configuration the check valve selectively allows fluid communication from the inside of the elongate member to a region outside the elongate member, but selectively blocks fluid communication from the region to the inside of the elongate member, and in a second configuration the check valve allows two-way fluid communication between the region and the inside of the elongate member.

In some embodiments the act of inserting the body portion of the protector into the end of an elongate member which has already been sealed at its other end, drives gas through the check valve. Withdrawing the body portion of the protector from the end of the elongate member would reduce the pressure inside the elongate member and the withdrawal is thus opposed by external air pressure. In other words, the pressure difference between the inside of the elongate member and the region outside the elongate member provides a force which secures the protector to the pipe, thereby reducing the probability that the protector will detach during use. Additionally, the environment inside the pipe may be controlled more effectively.

The check valve may be provided on a flexible wall of the protector, allowing the check valve to be easily accessed by a user or robotic apparatus. The flexible wall and an inner surface of the body portion may define an inner cavity. The flexible wall may be provided at or adjacent to the first end of the body portion. As the pressure inside the elongate member is reduced, the flexible wall may flex in the forward direction. The flexible wall may be part of the flexible portion, or it may be separate. The check valve may be mounted on a ring or other structure located in the flexible wall.

In an embodiment, the valve actuator may comprise a handle. When a user moves the handle in a first direction, the check valve may be switched to the first configuration, maintaining a low pressure region inside the elongate member and securing the protector to the pipe. When the user moves the handle in a second direction, the check valve may be switched to the second configuration, allowing a pressure inside the elongate member to equalize with a pressure outside the elongate member as the body portion of the protector is withdrawn from the elongate member.

The protector may further comprise a pump for removing fluid from the inside of the inside of the elongate member. Optionally, the pump may be actuated by moving the handle in the first direction, and halted by moving the handle in the second direction.

Optionally, the protector may comprise a cover portion configured to extend over a portion of an outer surface of the elongate member when the body portion is received within the elongate member. Optionally, the inner surface of the cover portion may be provided with one or more second resilient members (e.g. formed from the second material), wherein, when the body portion is received in the elongate member, the second resilient members engage the portion of the outer surface of the elongate member. The second resilient members may protect the portion of the outer surface of the elongate member (for example, the welding surfaces of pipes that are joined by welding) from damage.

The second resilient members may comprise one or more second flexible ridges. Optionally, the second ridges may extend in a direction parallel to the central axis of the protector. Additionally or alternatively, the first ridges may extend in a direction parallel to the central axis of the protector. Optionally, the first ridges may extend along the body portion and up into the cover portion to form the second ridges.

In an embodiment, the first material may be a plastics material. Additionally or alternatively, the second material may be a plastics material. For example, the first and second material may be formulated by adding different respective additives to a polymer, to give them different respective mechanical properties. Optionally, the first material and second material may be the same plastics material, the first material having a greater Shore hardness than the second material. Optionally, the first material may be polyethylene (PE), polyphenylene ether homopolymer (PEH), low-density polyethylene (PELD), medium-density polyethylene (PEMD), or polypropylene (PP). Optionally, the second material may be polyethylene (PE), polyphenylene ether homopolymer (PEH), low-density polyethylene (PELD), medium-density polyethylene (PEMD), and polypropylene (PP). Formulating the first and second material as plastics materials may provide any of several advantages. The rigid portion and flexible portion may be recyclable, reducing the pollution and waste associated with the manufacture of protectors. The protector may be produced in a single moulding operation in which the first and second materials are inserted during the same or overlapping periods into a mould.

Optionally, the cover portion may be provided with one or more handles, enabling a user to apply and remove the protector more easily. In an embodiment, the handles may be adapted to cooperate with a hook.

Optionally, the protector may further comprise a chip, located within the rigid portion, having a memory for storing information regarding at least one property of the protector. Thereby, manual inspections and manual handling of the protector may be reduced. The chip may further be used to track the protector, for example when the protector is in transit between a manufacturer and a site where the cap is to be deployed (e.g. a midstream pipeline). The chip may also be used to monitor an environment inside a pipe to which the protector is applied during long-term storage of the pipe. The chip may interact with an apparatus for applying and removing the protectors.

Preferably, the at least one property comprises a physical property of the protector or its present environment. Optionally, the chip may be a RFID chip. Preferably, the protector further comprises an LED, located within the rigid portion, for indicating an activity of the chip.

The chip may be capable of communicating with a reader device outside the protector to transmit the information to the reader device, e.g. in response to an interrogation signal generated by the reader device and recognized by the chip.

A second aspect of the invention proposes, in general terms, a protector for an elongate member, such as a non-threaded pipe. The protector comprises a rigid portion formed from a first material having a first elastic modulus. The rigid portion comprises a body portion for insertion into a cavity defined by an end portion of the elongate member, and a cover portion extending from the body portion. The protector further comprises a flexible portion which is formed from a second material having a second elastic modulus and provided on an outer surface of the body portion, the second elastic modulus being smaller than the first elastic modulus. That is, for a given unit volume, the rigid portion is more resistant to deformation than the flexible portion. The flexible portion has a plurality of resilient members, the resilient members comprising a plurality of deformable fins. The fins may be provided around the periphery of the body portion—for example, spaced-apart in a circumferential direction of the body portion. Each fin may have a maximum radial extent which is the same as that of each other fin. When the body portion of the protector is received within a cavity of an elongate member, the deformable fins engage the inner surface of the cavity, and the cover portion covers an end surface of the elongate member. The fins may be reliantly urged against the outer surface of the elongate member, and/or be secured to the inner surface of the cavity by frictional forces. When the body portion is inserted into the cavity and the protector is rotated about the central axis, the fins may deform or snap into a locking configuration to hold the protector in place. Hence, the manual force required to apply the protector to a pipe may be reduced.

A third aspect of the invention proposes a method for manufacturing a protector of any of the types described above. The method comprises steps of:

providing the first and second materials in a liquid state;
    injecting the first and second materials into a mould;
    forming the rigid portion from the first material; and
    forming the flexible portion from the second material.

The method may comprise moulding the rigid portion and flexible portion by injecting the first and second materials into the mould during the same or overlapping time periods.

Another expression of the invention is a method of applying a protector of any of the types described above to an elongate object and/or removing a protector from an elongate member.

The method of applying the protector may comprise inserting the body portion of the protector into a non-threaded pipe.

BRIEF DESCRIPTION OF THE FIGURES

Embodiments of the invention will now be described for the sake of example only with reference to the following drawings in which:

FIGS. 2A and 2B are side views of the protector of FIG. 1.

FIG. 3 is a further side view of the protector of FIG. 1 in use.

DETAILED DESCRIPTION OF THE EMBODIMENTS

Figure 1:
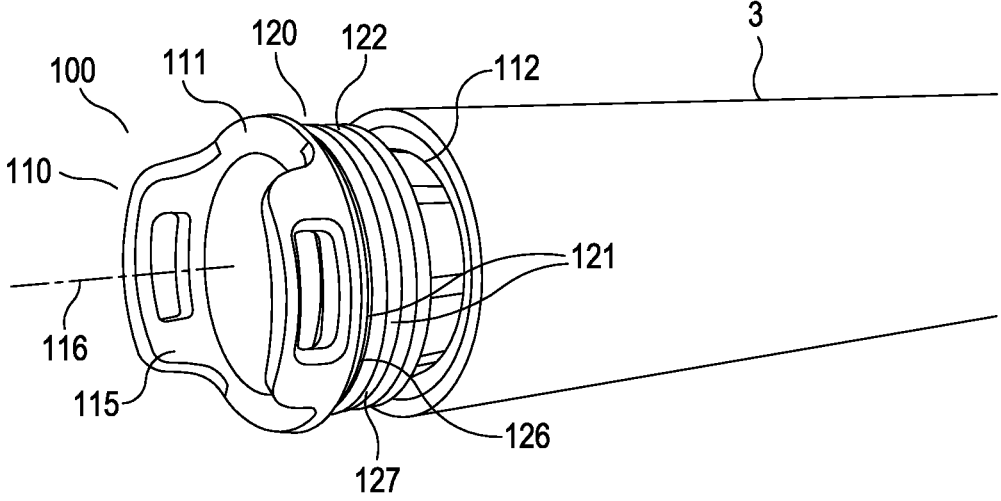
FIG. 1 is a diagram showing a protector which is a first embodiment of the invention being connected to a pipe.

Referring first to FIG. 1, a protector 100 according to a first embodiment of the invention is shown during insertion into an elongate member 3. The protector comprises a rigid portion 110 and a flexible portion 120. The rigid portion 110 may be formed from a first material having a first elastic modulus, and the flexible portion 120 may be formed from a second material having a second elastic modulus, smaller than the first elastic modulus. That is, the second material is more flexible than the first material. The rigid portion 110 comprises a cover portion 111 and a body portion 112, and is provided with two handles 115. In a variant of the embodiment, a single handle 115 may be provided on the cover portion 111. The body portion 112 defines and surrounds a central axis 116 which in use is positioned parallel to an axis of a central cavity of the elongate member 3. Note that the body portion 112 may be substantially cylindrical, i.e. have substantially the same cross-section in different planes transverse to the axis 116, and this cross-section may be substantially a circle. In variations, the cross-section may be other shapes, e.g. a square or hexagon centered on the axis 116.

The flexible portion 120 is provided with a plurality of resilient members 121 on its surface. For example, the surface of the flexible portion 120 facing away from the body portion 112 may comprise land area(s) 126 and resilient members 121 upstanding from the surface between the land areas 126 in the direction away from the body portion 112. The land areas 126 may be of substantially constant distance from the axis 116 of the body portion 112 (i.e. the land area(s) 126 may be substantially cylindrical with a circular cross-section in a plane transverse to the axis 116), or for any given position along the axis may have a substantially constant corresponding distance from the axis 116 (e.g. each land area may be frustoconical). Each of the resilient members 121 may be solid (i.e. the second material does not define a hollow chamber within the resilient member 121, e.g. containing a gas or for receiving a gas).

As shown in FIG. 1, the resilient members 121 comprise a plurality of first flexible ridges 122, each first ridge 122 encircling a central axis 116 of the protector 100, and two circumferential sealing ridges 123 (shown in FIG. 2A). The ridges 122, 123 extend in a radial direction from the central axis 116 of the protector 100. The first and/or second ridges 122, 123 may be non-helical. The first and/or second ridges 122, 123 may also be solid (e.g. not defining a gas chamber within them). For example, the first ridges 122 may be circular, as shown in FIG. 1. That is, each of the first ridges 122 has a respective radially outer "free" edge 127 which is substantially circular. The sealing ridges 123 may also be circular. Thus, at all positions along the respective free edge of each of the ridges 122, 123, the free edge has the same radial distance (height) from the axis 116. In an embodiment, each of the first ridges 122 has the same maximum radial extent, i.e. for each of the first ridges 122, the respective free edge is at the same radial distance as the free edge of the other first ridges 122.

Note that in variations, the first ridges 122 need not all extend fully around the axis 116, but instead one or more first ridges 122 may subtend an angle around the axis of less than 360 degrees. The spacing between the plurality of first ridges 122 may be constant, as shown in the diagram, or may vary along an axial direction of the protector 100, which is parallel to the length direction of the elongate member (i.e. its axis of translational symmetry) and orthogonal to a respective plane in which each of the first ridges 122 lies.

As the body portion 112 of the protector 100 is inserted into a cavity defined by the elongate member 3 (where the cavity, which is typically cylindrical with a circular cross-section, has an inner surface with a radius measured from an axis of the elongate member 3 which is greater than a radius of the body portion 122 at the part of the body portion 122 in axial register with the first ridges 122, and less than the distance of the edge 127 of the first ridges 122 from the axis 116 of the body portion), the first ridges 122 engage an inner surface of the cavity. For example, the first ridges 122 may be reliantly urged against the inner surface, and/or provide a frictional force between the protector 100 and the elongate member 122, thus securing the protector 100 to the elongate member 3. When the body portion 112 is received in the cavity, the cover portion 111 of the protector 100 sits over an end surface of the elongate member 3 to protect the end surface from mechanical damage.

The sealing ridges 123 may be reliantly urged against the inner surface of the cavity, and/or secured to the inner surface by frictional forces, preferably so as to provide an airtight seal encircling the cavity. Thereby, fluid and debris may be prevented from entering the cavity, and an environment inside the elongate member 3 may be controlled. In an embodiment, the number of sealing ridges 123 may be two or more, in order to increase the sealing efficiency of the protector 100 when applied to an elongate member 3. Optionally, the sealing ridges 123 may extend round the circumference of the protector 100.

As shown in FIG. 2A, the flexible portion 120 may further comprise a flexible member 129 covering at least a portion of a surface of the cover portion 111. For example, the flexible member 129 may be provided on a surface of the cover portion 111 which is closest to an end surface of an elongate member 3 when the body portion 112 is received in the cavity of the elongate member 3, such that, when the body portion 112 is received in the cavity of the elongate member 3, the flexible member 129 comes into contact with the end surface of the elongate member 3 (such as a rim of a pipe). The periphery of flexible member 129 may be circular (i.e. the flexible member 129 has a circular radially-outer edge), and may have a radial extent greater than the ridges 122, 123. It may provide a cushion between the cover portion 111 of the rigid portion 110 and the pipe.

As mentioned above, when the protector 100 is not applied to an elongate member 3, the ridges 122 may have substantially equal radial extent, which is substantially constant at all circumferential positions about the axis 116.

Optionally, the flexible member 129 may have a greater maximum radial extent than the maximum radial extent of each of the first ridges 122.

By contrast, when the protector 100 is applied to an elongate member 3, the first ridges 122 come into contact with the inner surface of the cavity of the elongate member 3. As the first ridges 122 engage the inner surface of the cavity, they deform along an axial direction of the protector 100, as shown in FIG. 2B. The deformed first ridges 122 exert a restoring force on the inner surface, securing the protector 100 to the elongate member 3. The force between the first ridges 122 and the inner surface of the elongate member 3 is supplied substantially entirely by the resilience of the second material, and is thus a function of the elastic modulus of the second material.

A protector 100 according to the embodiment is shown applied to an elongate member 3 in FIG. 3. The flexible member 129 lies between the cover portion 111 and an end surface of the elongate member 3, thus increasing a sealing efficiency of the protector 100 and increasing a coupling efficiency between the protector 100 and the elongate member 3. The flexible member 129 may also absorb at least part of the impact of any shocks sustained by the protector 100, reducing the energy transferred to the elongate member 3 itself. The cover portion 111 lies over the flexible member 129 and the end surface of the elongate member 3, protecting the end surface from mechanical damage.

The protector 100 is provided with two handles 115. The handles 115 are operative to cooperate with a hook 10 as shown in FIG. 3, facilitating removal of the protector 100. Alternatively, the handles 115 may be operated manually by a user, or operated by one or more robotic arms.

Figure 4:
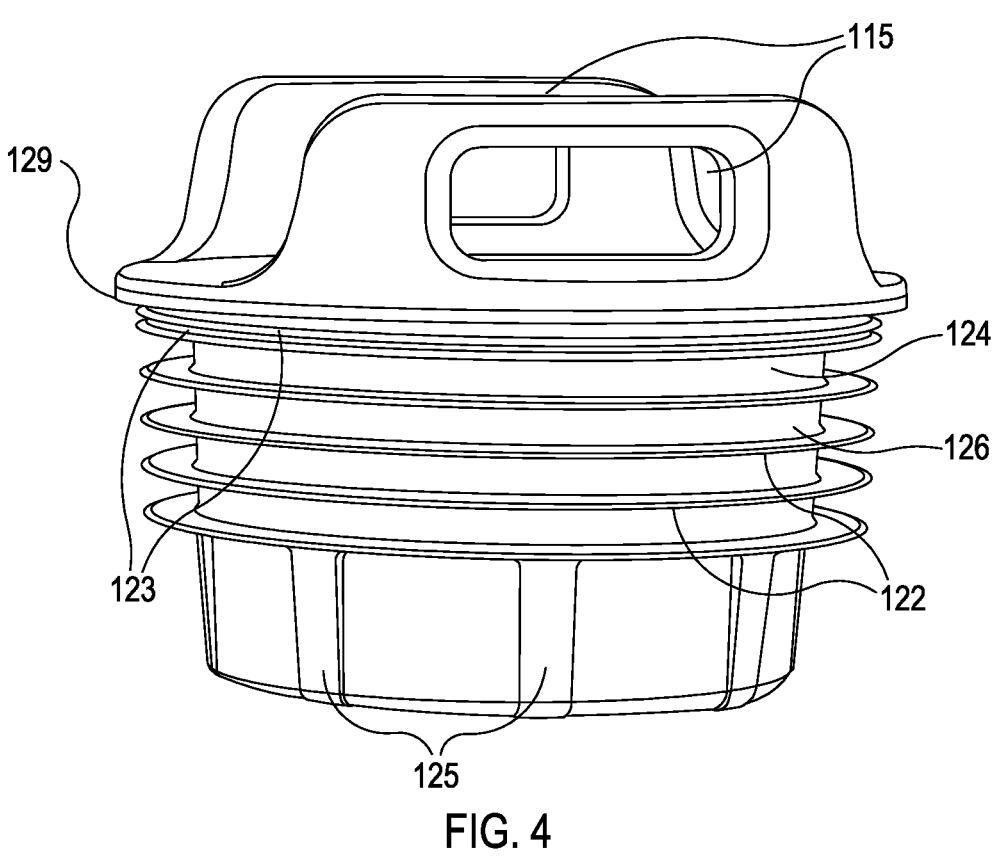
FIG. 4 is a diagram showing a further side view of the protector of FIG. 1.

FIG. 4 shows a further view of the protector 100. The flexible portion 120 comprises a flexible collar 124 from which the first ridges 122 extend. The collar 124 is cylindrical in shape, and covers a portion of the outer surface of the body portion 112. The first ridges 122 may be spaced-apart, as shown in FIG. 4, or may be adjacent to one another. The first ridges 122 may take any shape. For example, their cross-section transverse to a length direction of the ridges 122 may be triangular or semi-circular. In a variation of the embodiment, the collar 124 may cover the entirety of the outer surface of the body portion 112. In yet another variation, the flexible portion 120 may not comprise a collar 124, and the first ridges 122 may be provided directly on the outer surface of the body portion 112.

The flexible portion 120 comprises a plurality of flexible legs 125 which secure the flexible portion 120 to the body portion 112. Optionally, these legs 125 may be spaced in an equidistant fashion about the central axis of the protector 100. In an embodiment, the protector 100 may be symmetric about its central axis. Alternatively, the flexible portion 120 may be secured to the body portion 112 without flexible legs 125, for example using an adhesive or by an inner surface of the flexible portion 120 containing protrusions and/or recesses which interlock with correspondingly shaped recesses and/or protrusions on the outer surface of the rigid portion 110.

Optionally, one or both of the rigid portion 110 and flexible portion 120 may be formed from plastic. For example, the rigid portion 110 and flexible portion 120 may both be formed from the same plastic, but the plastic from which the rigid portion 110 is formed may have a greater Shore hardness than the plastic from which the flexible portion 120 is formed. Examples of suitable plastics from which the rigid portion 110 may be formed include, but are not limited to, polyethylene (PE), polyphenylene ether homopolymer (PEH), low-density polyethylene (PELD), medium-density polyethylene (PEMD), and polypropylene (PP). Examples of suitable plastics from which the flexible portion 120 may be formed include, but are not limited to polyethylene (PE), polyphenylene ether homopolymer (PEH), low-density polyethylene (PELD), medium-density polyethylene (PEMD), and polypropylene (PP).

Figure 5:
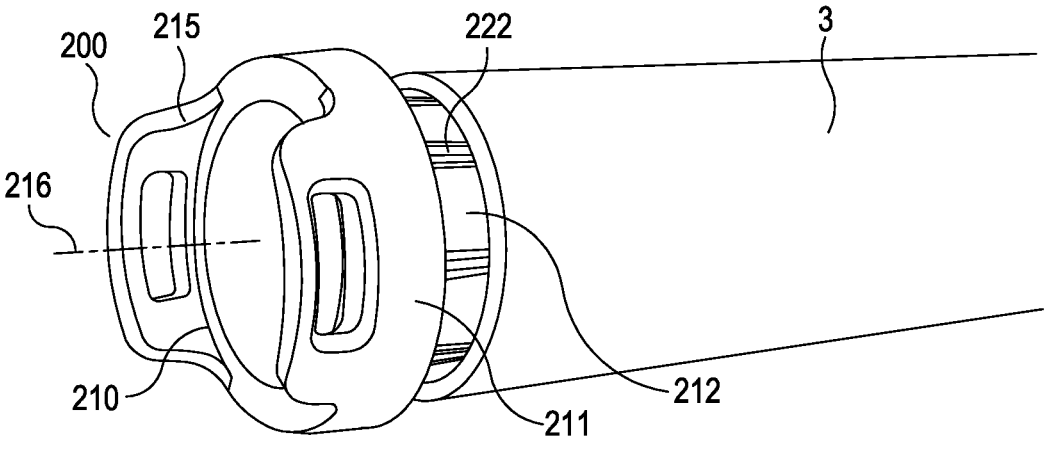
FIG. 5 is a diagram showing a protector which is a second embodiment of the invention being connected to a pipe.

Turning to FIG. 5, a protector 200 which is a second embodiment of the invention is shown, viewed along a first direction. Elements of the second embodiment corresponding to elements of the first embodiment are shown by reference numerals 100 higher.

The protector 200 is shown during insertion into an elongate member 3. The protector 200 comprises a rigid portion 210, the rigid portion 210 comprising a cover portion 211 and body portion 212. The cover portion is provided with two handles 215, allowing the protector 200 to be easily applied and/or removed by a user or one or more robotic arms. Alternatively, the handles 215 may be operative to cooperate with a hook to facilitate removal of the protector 200. The rigid portion 210 is formed of a first material (which may be the first material of the embodiment of FIG. 1) having a first elastic modulus. The body portion 212 defines an axis 216. Both the cover portion 211 and the body portion 212 have respective radially-outer surfaces which are cylinders of circular cross-section, with the cover portion 211 having a greater radius then the body portion 212. As described below, the cover portion 211 also presents an inwardly-facing surface (i.e. facing towards the axis 216) which may also be substantially cylindrical with a circular cross-section.

The body portion 212 is provided on its outwardly-facing surface with a flexible portion comprising a plurality of first flexible ridges 222. The first flexible ridges 222 are formed of a second material having a second elastic modulus which is less than the first elastic modulus. The first ridges 222 extend along an axial direction of the protector 200. Optionally, each of the first ridges 222 may extend radially-outwardly to a distance from the axis 216 which is the same along at least a portion of the length of the first ridge (i.e. the radially-outer edge of first ridge 222 may be a line parallel to the axis 216), and which may be the same for each of the first ridges 222. The first ridges 222 have a cross-section having a 'toothed' shape, including multiple substantially-parallel radially outer edges. In variants of the embodiment, one or more of the first ridges 222 may have a cross-section of a different shape—for example, a triangular or semi-circular cross-section. The first ridges 222 are provided directly on a radially outwardly facing surface of the body portion 212. For example, they may be attached to the surface using an adhesive, or the body portion 212 and first ridges 222 may be jointly moulded during the manufacturing process. In variants of the embodiment, the first ridges 222 may instead extend from a flexible collar which is provided on the outer surface of the body portion 212, and covers a part of, or the whole of, the outer surface. The first ridges 222 may be spaced-apart, as shown in FIG. 5. For example, the first ridges 222 may be spaced in an equidistant fashion around the body portion 212. In a variant of the embodiment, the first ridges 222 may be located adjacent to one another on the surface of the body portion 212.

Figure 6:
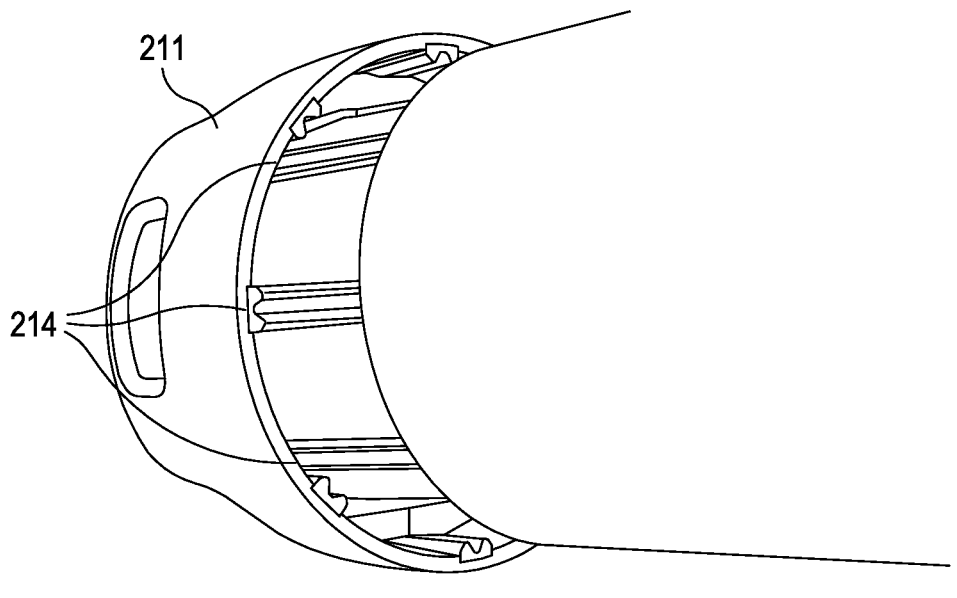
FIG. 6 is a diagram showing a second view of the protector of FIG. 5 being connected to a pipe.

FIG. 6 shows the protector 200 of FIG. 5 viewed along a second direction opposite to the first direction. The cover portion 211 includes a portion in the form of a hollow circular cylinder (that is a wall) which is radially spaced outward from the body portion 212 and extends along a part of the axial length of the body portion 212. When the body portion 212 is inserted into the elongate member 3, the wall of the cover portion 211 extends over a portion of an outer surface of the elongate member 3. This is, an end portion of the elongate member 3 is located in a cavity defined between the cover portion 211 and the body portion 212, thus protecting the outer surface of the end portion of the elongate member 3 from mechanical damage.

An inner surface of the cover portion 211 is provided with a plurality of second flexible ridges 214 on a radially inwardly facing surface of the wall of the cover portion 211. In FIG. 6 these too are depicted with a toothed profile, where each second flexible ridge 214 has multiple edges, i.e. portions of the surface of the ridge 214 where the distance of the ridge 214 from the axis 216 of the body portion is locally minimal. Optionally, this distance is the same along the length of each second flexible ridge 214 (i.e. the radially-inner edge of second ridge 214 may be a line parallel to the axis 216), and may be the same for each of the second ridges 214. The second ridges 214 are spaced-apart in a circumferential direction around the central axis of the protector 200. In a variant of the embodiment, the second ridges 214 may be located adjacent to one another on the inner surface of the cover portion 211. The first and/or second ridges 222, 214 may each be solid, i.e. not defining an internal (e.g. gas containing) cavity.

When the body portion 212 is received within the interior of the elongate member 3, the second ridges 214 come into contact with the end surface of the elongate member and a portion of the outer surface of the elongate member. The second ridges 214 may be reliantly urged against the end surface and portion of the outer surface, and/or may increase a frictional force between the protector 200 and elongate member 3, thereby securing the protector 200 to the elongate member 3. Alternatively or additionally, the second ridges 214 may deform upon contact with the end surface and portion of the outer surface, yielding a restoring force which secures the protector 200 to the elongate member 3. Thus, the second ridges 214 may absorb at least a part of the impact of any shocks sustained by the protector 200, reducing the energy transferred to the elongate member 3, and increase a sealing efficiency of the protector 200 when applied to the elongate member 3. Hence, mechanical damage sustained by the elongate member 3 may be reduced or prohibited, and fluid and debris may be prevented from entering the inner cavity of the elongate member 3. In a variant of the embodiment, one or more sealant ridges may be provided on an inner surface of the cover portion 211, increasing a sealing efficiency of the protector 200 when applied to the elongate member 3.

In an embodiment, the first ridges 222 may extend in an axial direction along the body portion 212 and up into the cover portion 211 to form the second ridges 214. Alternatively, the first ridges 222 and second ridges 214 may be formed separately on the protector 200. The first ridges 222 and second ridges 214 may be formed from the same second material. Alternatively, the first ridges 222 and second ridges 214 may be formed from two different materials, both having an elastic modulus less than that of the first material.

Figure 7:
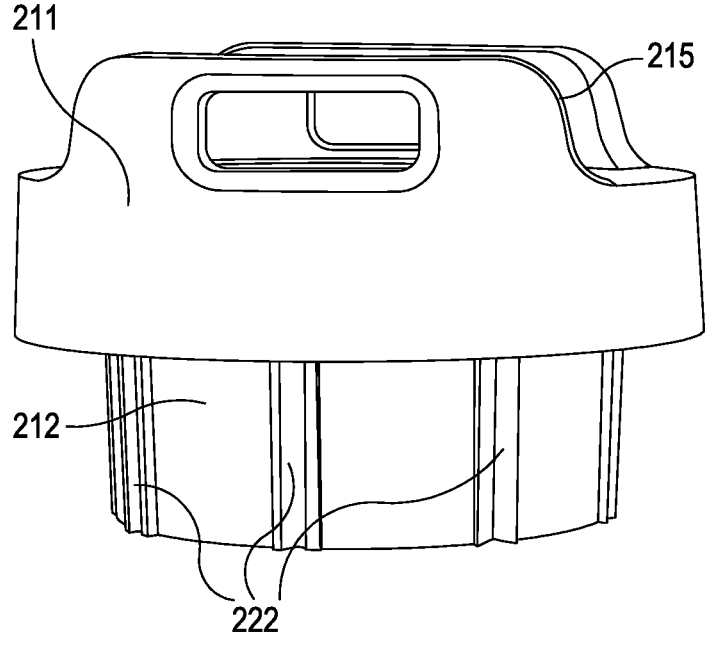
FIG. 7 is a diagram showing a side view of the protector of FIG. 5.

FIG. 7 shows a side view of the protector 200. As discussed above, in the embodiment of FIG. 6 the first ridges 222 extend along the body portion 212 and up into the cover portion 211 to form the second ridges 214.

Figure 8:
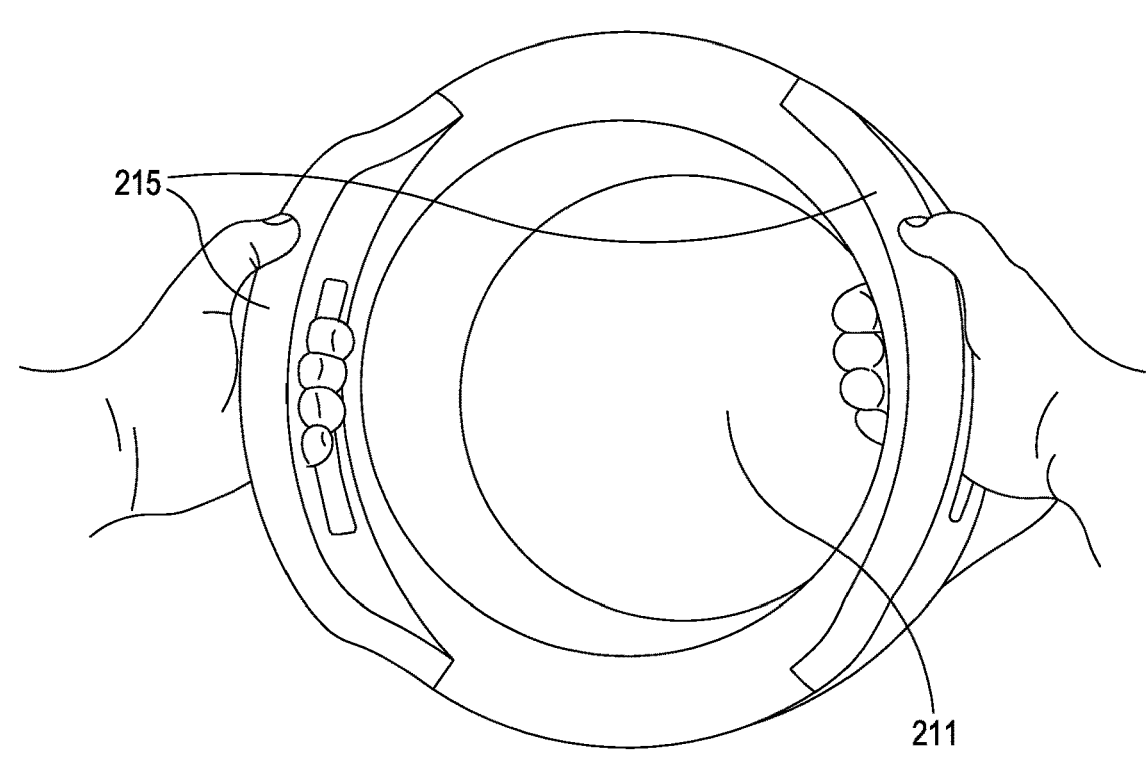
FIG. 8 is a diagram showing a third view of the protector of FIG. 5 being connected to a pipe.

FIG. 8 shows the protector 200 viewed from above. The handles 215 are operated manually by a user in FIG. 8, but may instead be operated by one or more robotic arms. Alternatively or additionally, one or more of the handles 215 may be operative to cooperate with a hook to facilitate removal of the protector 200. In a variant of the embodiment, a single handle 215 may be provided on the cover portion 211. Optionally, the handle(s) 215 may be formed integrally with the cover portion 211.

Figure 9:
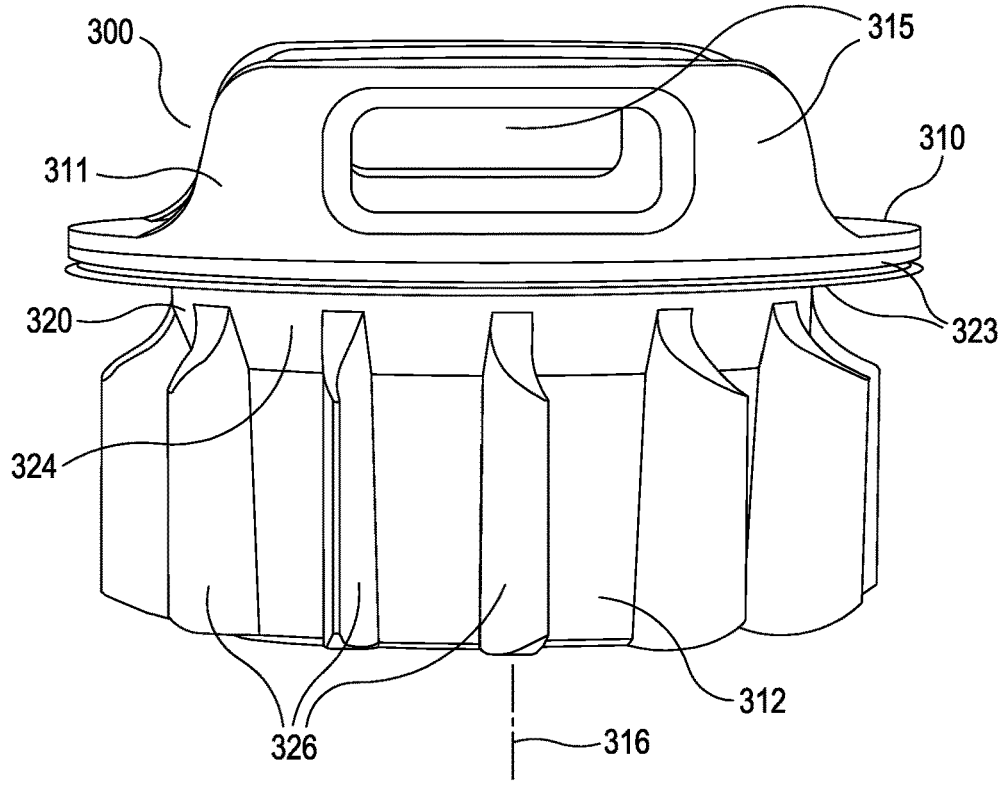
FIG. 9 is a diagram showing a side view of a protector which is a third embodiment of the invention.

Turning to FIG. 9, a protector 300 which is a third embodiment of the invention is shown. Elements of the third embodiment corresponding to elements of the first embodiment are shown by reference numerals 200 higher.

FIG. 9 shows a side view of the protector 300. The protector 300 comprises a rigid portion 310 and a flexible portion 320. The rigid portion 310 is formed of a first material having a first elastic modulus, and the flexible portion 320 is formed of a second material having a lower second elastic modulus. The rigid portion 310 comprises a cover portion 311 and a body portion 312, which defines an axis 316. Two handles 315 are provided on the cover portion 311. The flexible portion 320 comprises a plurality of resilient members, the resilient members including a plurality of deformable fins 326 and sealant ridges 323, provided on a flexible collar 324. The deformable fins 326 and/or sealant ridges 323 may be solid, i.e. not containing a (e.g. gas-containing) cavity. The deformable fins 326 extend along the axial direction 316 of the protector 300, and may be spaced-apart around the periphery of the body portion 312, as shown in FIG. 9. In an embodiment, one or more of the sealant ridges 323 may lie flush with or above an end surface of the elongate member 3 when the protector 300 is applied to the elongate member 3—that is, one or more of the sealant ridges 323 may function as a flexible member 329. The deformable fins 326 may have the same maximum distance from the axis 316 along substantially the whole of their length, i.e. the radially-outer edge of the deformable fin 326 may be a line parallel to the axis 316.

Figure 10:
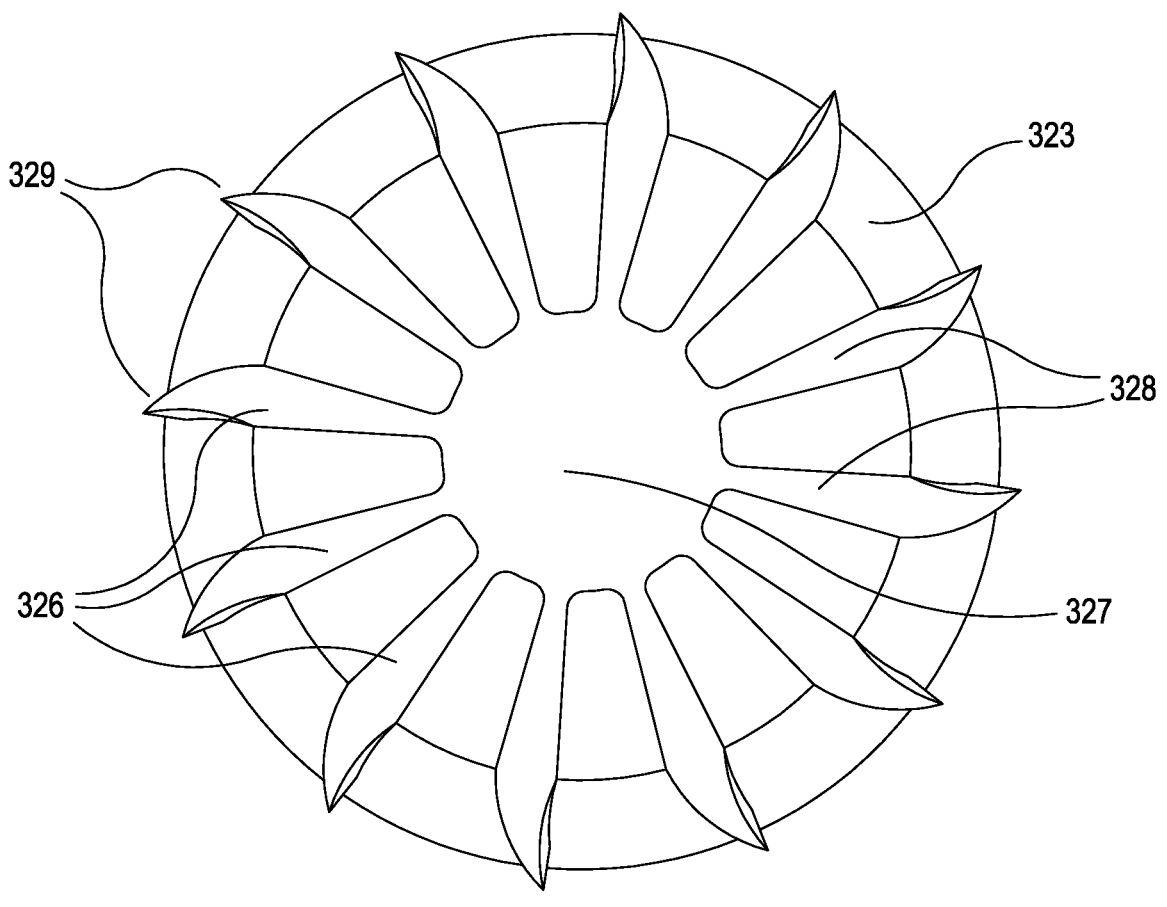
FIG. 10 is a diagram showing a bottom view of the protector of FIG. 9 in a first configuration.

FIG. 10 shows a bottom view of the protector 300 of FIG. 9 in a first configuration. The flexible portion comprises a central body 327 and the deformable fins 326 extend radially outwards from the body 327. Each deformable fin 326 comprises a respective curved tip 329 and is connected to the central body 327 by a respective spoke 328. In the first configuration, the deformable fins 326 may have a greater maximum radial extent than the sealant ridges 323.

Figure 11:
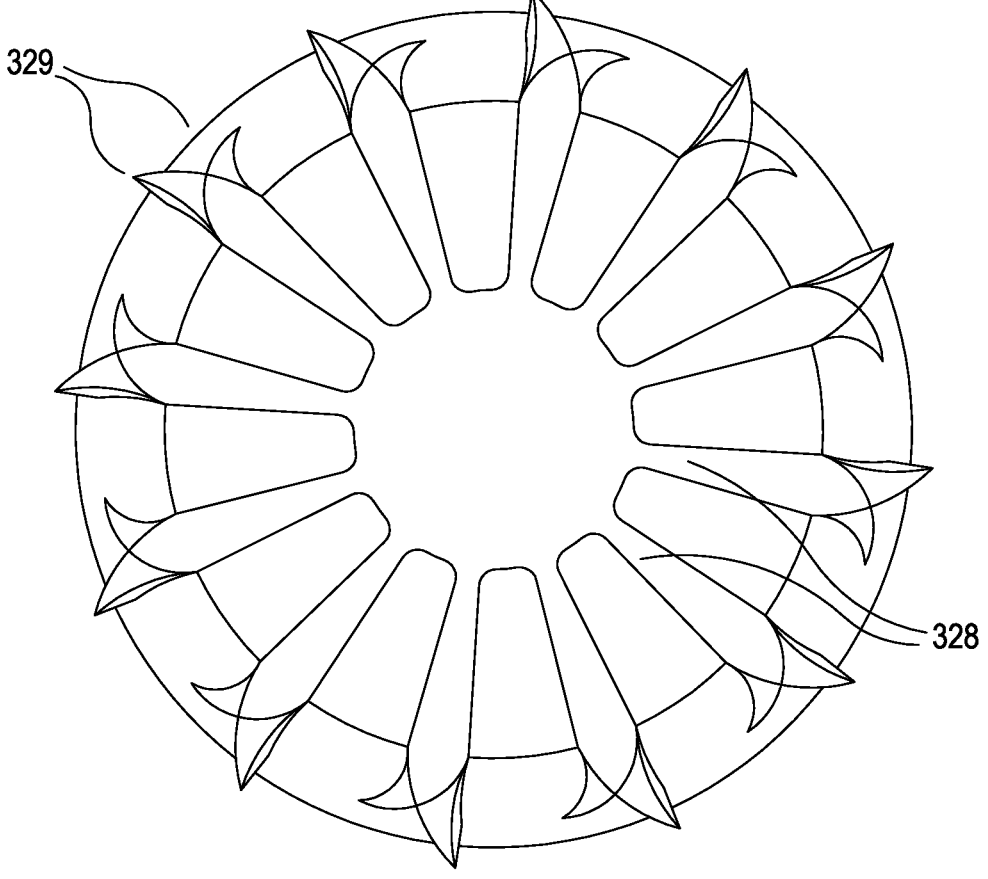
FIG. 11 is a diagram showing a bottom view of the protector of FIG. 9 in a second configuration.

FIG. 11 shows a bottom view of the protector 300 of FIG. 9 in a second configuration. In use, the protector 300 is inserted into the cavity of the elongate member 3 with the deformable fins 326 in the first configuration—for example, a user may push the protector 300 into the cavity. The protector 300 may then be rotated with respect to the elongate member 3, causing the deformable fins 326 to deform or snap into a locking configuration, such as the second configuration. In the locking configuration, the deformable fins 326 provide a restoring force securing the protector 300 to the elongate member 3. Additionally, the deformable fins 326 may increase a frictional force securing the protector 300 to the elongate member 3. The forces are generated by resilience in the deformable fins 326 and depend upon the second elastic modulus. In an embodiment, only the tip 329 of each deformable fin 326 may deform into the locking configuration, whilst the spoke 328 does not deform, as shown in FIG. 11. In the second configuration, the deformable fins 326 may have a smaller maximum radial extent than the sealant ridges 323.

Figure 12:
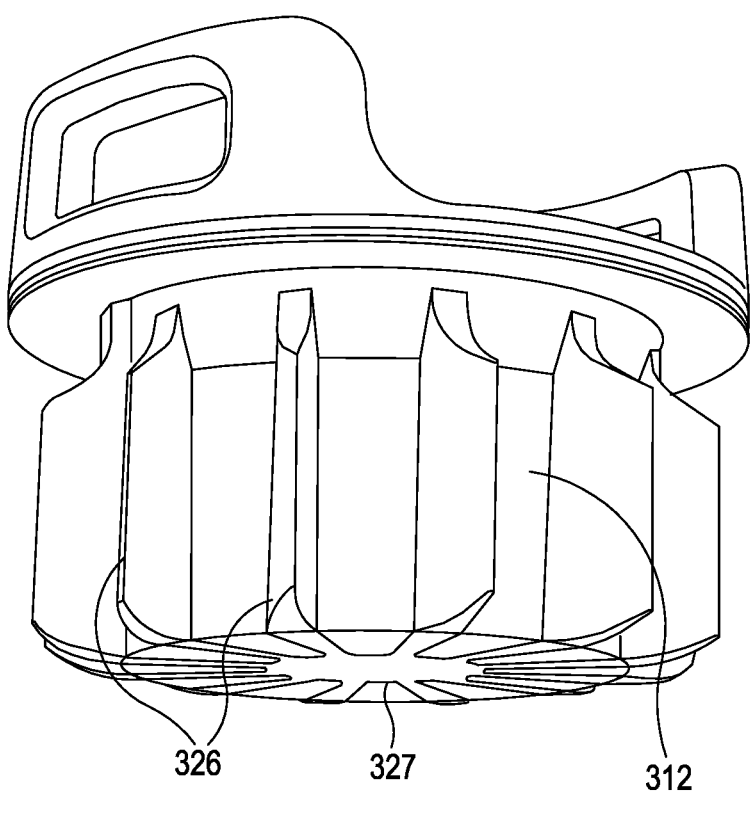
FIG. 12 is a diagram showing a second side view of the protector of FIG. 9.

FIG. 12 shows a side view of the protector 300 of FIG. 9 in the first configuration. The body 327 is located within the body portion 312. In a variant of the embodiment, the deformable fins 326 may be formed on an outer surface of the body portion 312, without requiring a body 327. For example, the deformable fins 326 may be attached to the outer surface using an adhesive, or the deformable fins 326 may be jointly moulded with the body portion 312 during manufacture. The body 327 and deformable fins 326 may be formed from the same material. Alternatively, the body 327 and deformable fins 326 may be formed from two different materials.

Figure 13:
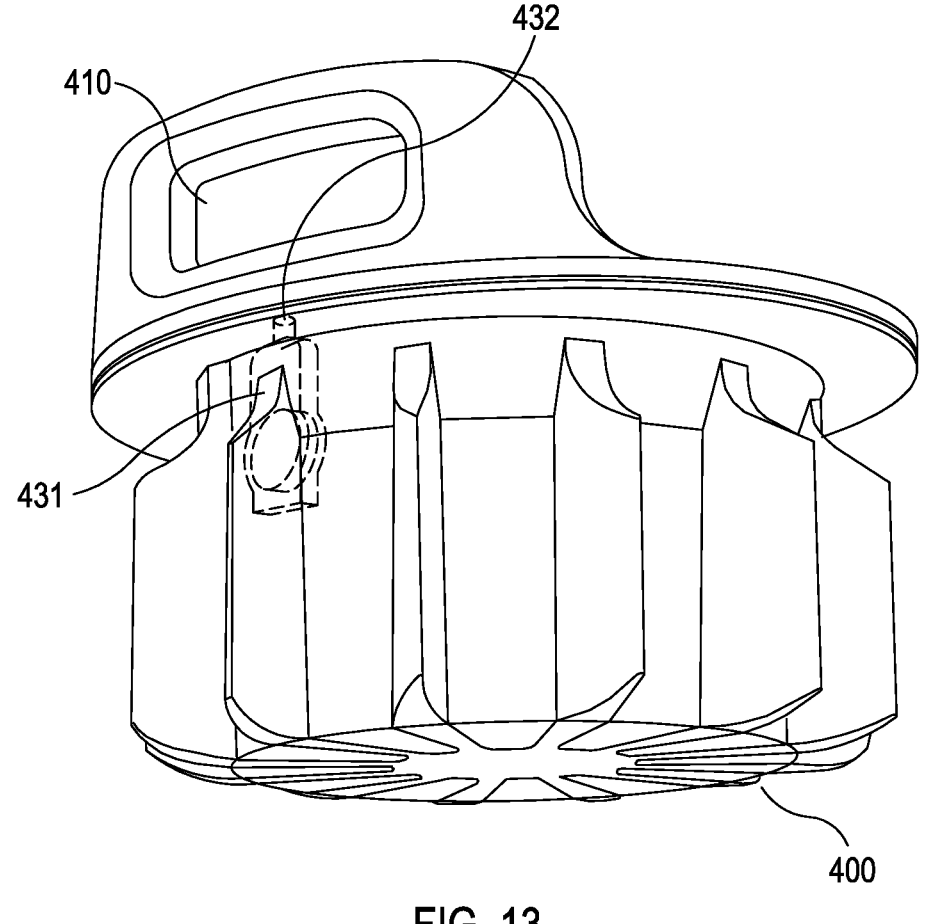
FIGS. 13-14 are diagrams showing a protector which is a fourth embodiment of the invention.

Turning to FIG. 13, a protector 400 which is a fourth embodiment of the invention is shown. Elements of the fourth embodiment corresponding to elements of the first embodiment are shown by reference numerals 300 higher.

The protector 400 is provided with an integrated circuit (chip) 431, for storing information regarding at least one property of the cap. The at least one such property may comprise an identity number associated with the protector 400. Alternatively or additionally, the at least one property may comprise a physical quantity associated with the protector 400 itself (e.g. a date on which it was manufactured, or a temperature of the protector 400). Alternatively or additionally, at least one property may be a physical quantity associated with the environment of the protector 400 at the present location of the protector 400 (e.g. the environment's temperature (which may be identical to that of the protector 400), the environment's humidity, or the protector's geographical location). The properties may include properties at at least one previous time, e.g. any one or more of a temperature of the protector 400 at a previous time, a temperature and/or humidity of the protector's environment at a previous time, and/or a geographic location of the protector 400 at a previous time.

The chip 431 may be capable of communicating with a reader device outside the protector 400 to transmit the information to the reader device, e.g. in response to an interrogation signal generated by the reader device and recognized by the chip 431. The chip 431 is provided within the protector 400. The chip 431 may be provided within the rigid portion 410, for example within a cover portion or body portion of the rigid portion 410.

For example, the protector 400 may be provided with a RFID chip 431, located in a position in the protector 400 where it is not damaged due to transport. Specifically, the RFID chip 431 is provided located within the rigid portion 410, such as inserted into a cavity (hole) in the rigid portion 410, or even embedded into the material of the rigid portion 410 so as to be permanently encased in it. The RFID chip 431 has a memory for storing information regarding at least one property of the protector 400. In this way, manual inspections and manual handling of the protector 400 may be reduced. The RFID chip 431 may be further used to track the protector 400, for example when the protector 400 is in transit between a manufacturer and a site where the cap is to be deployed (e.g. a midstream pipeline). The RFID chip 431 may also be used to monitor an environment inside a pipe to which the protector 400 is applied during long-term storage of the pipe. The RFID chip 431 may interact with an apparatus for applying and removing the protectors 400.

Optionally, the protector 400 may include one or more chips 431 (which may be respective one(s) of the RFID chip(s) 431, or provided within a common module 432 with one or more of the RFID 431 chip(s)) which is operative to generate visible light. Again these "LED chip(s)" 432 are located within a cover portion or body portion of the rigid portion 410 to avoid damage. The LED chips 432 may be operative to generate a visible light signal upon one of the property or properties meeting a criterion. Optionally, the criterion may depend upon the values of at least one of the properties at multiple times (e.g. if one of the properties (e.g.

humidity) is recorded as being above a threshold for more than a certain amount of time).

The rigid portion 410 may include one or more through holes through which radio-frequency signals and/or visible light exit to the outside of the protector 400.

Figure 14:
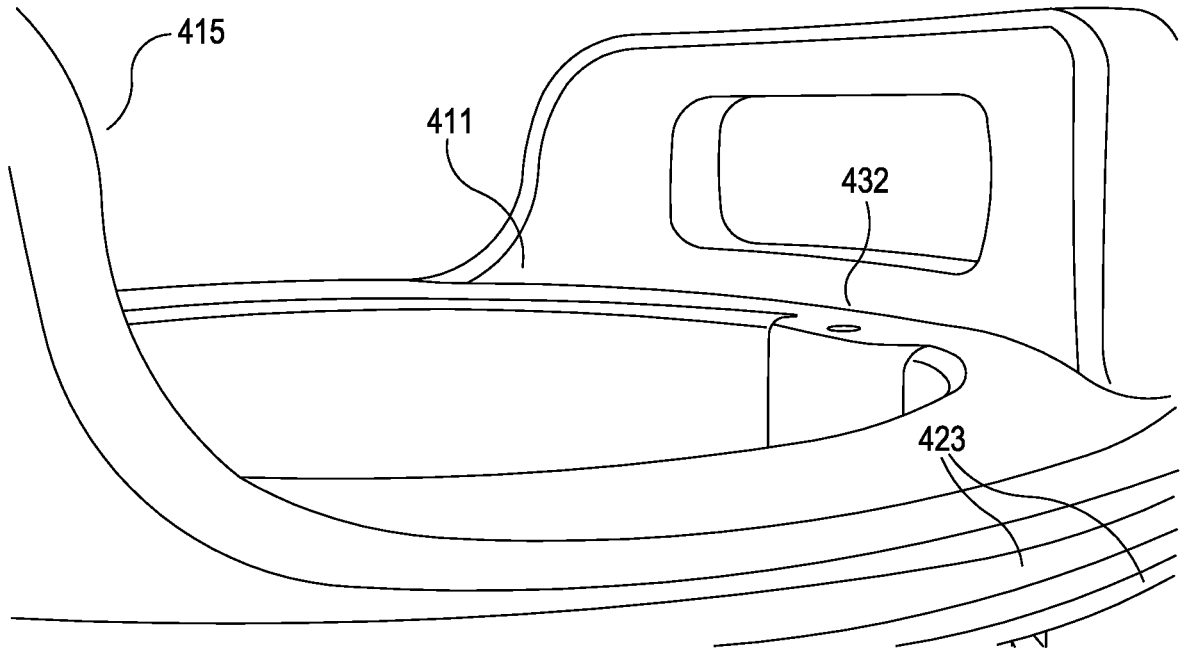

FIG. 14 shows a second view of the embodiment of FIG. 13. The LED chip 432 is embedded within the cover portion 411, the cover portion 411 being provided with a through-hole to allow radio-frequency signals and/or visible light exit to the outside of the protector 400. The cover portion 411 is provided with two handles 415. The protector further comprises two sealant ridges 423 provided adjacent to the cover portion 411.

In an embodiment, the protector 400 in which the RFID chip 431 is installed may be a protector according to any preceding embodiment.

Figure 15:
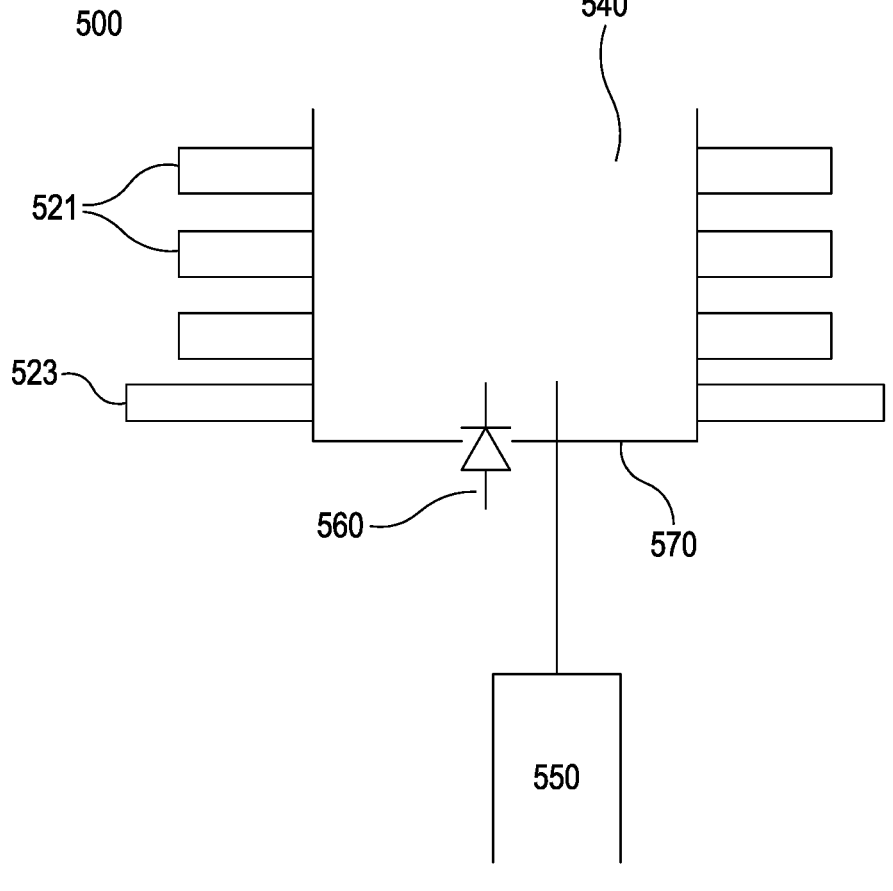
FIG. 15 is a diagram showing a cross-sectional view of part of a protector which is a fifth embodiment of the invention.

Turning to FIG. 15, a cross-sectional view of part of a protector 500 which is a fifth embodiment of the invention is shown. Elements of the fifth embodiment corresponding to elements of the first embodiment are shown by reference numerals 400 higher.

The protector 500 comprises a rigid portion and a flexible portion. The rigid portion comprises a body portion and a cover portion. The body portion defines an inner cavity 540. The flexible portion comprises a plurality of resilient members 521. Optionally, the resilient members 521 may be flexible ridges; alternatively, the resilient members may be deformable fins. The flexible portion further comprises a plurality of sealant ridges 523.

The inner cavity 540 of the protector is coupled to an optional pump unit 550. The pump unit 550 is operative to remove fluid from inside the inner cavity 540, and may be integral to the protector 500. Alternatively, the protector 500 may be operative to be connected to the pump unit 550.

The inner cavity 540 is separated from the region outside the protector 500 by a flexible wall 570 comprising a one-way check valve 560. The check valve 560 may be a one-way flapper valve, or any other suitable check valve. The flexible wall 570 may be part of the flexible portion, or it may be separate.

Alternatively, the protector 500 may not comprise a flexible wall 570. The check valve 560 may be installed in the rigid portion. For example, the rigid portion may define a passage extending between an outer surface of the cover portion and an outer surface of the body portion, and the check valve 560 may be provided within the passage. Thereby, when the body portion is received within a cavity of an elongate member such as a pipe, the passage connects the cavity of the elongate member and a region outside the protector 500.

The protector 500 may be applied to the elongate member with the check valve 560 in a second configuration. In the second configuration, the check valve 560 allows two-way fluid communication between the region and the inner cavity 540.

Once the body portion of the protector 500 has been received within the cavity of the elongate member, the check valve 560 may be switched to a first configuration and the pump unit 550 may be actuated. In the first configuration, the check valve 560 selectively allows fluid communication from the inner cavity 540 to a region outside the inner cavity 540, but selectively blocks fluid communication from the region to the inner cavity 540. Thus, fluid is removed from the inner cavity 540 by the pump unit 550, and no additional fluid may enter the inner cavity 540. Thereby, a pressure difference may be established between the inner cavity 540 and the region outside the inner cavity 540—for example, a vacuum may be established within the inner cavity 540.

The pressure difference between the inner cavity 540 and the region outside the inner cavity 540 yields a net force acting to secure the protector 500 to the elongate member. Thereby, the coupling efficiency between the protector 500 and elongate member may be increased, and a probability of the protector 500 detaching from the elongate member may be reduced. Additionally, the removal of fluid enables an environment within the elongate member to be controlled.

In a variant of the embodiment, no pump unit 550 may be present. Inserting the body portion of the protector 500 into the end of an elongate member which has already been sealed at its other end, drives gas through the check valve 560. Withdrawing the body portion of the protector 500 from the end of the elongate member would reduce the pressure inside the elongate member, and the withdrawal of the protector 500 is thus opposed by external air pressure, securing the protector 500 to the elongate member.

The flexible wall 570 may be made from a flexible (i.e. resilient) material, such that when the pressure difference is established between the inner cavity 540 and the region outside the inner cavity 540 the flexible wall 570 deforms rather than breaking. Optionally, the flexible wall 570 may be formed from the same material as the flexible portion. Providing the check valve 560 on the flexible wall 570 makes the check valve 560 easy to access. Alternatively, the check valve 560 may be mounted on a ring or other structure located in the flexible wall 570.

When it is desired to remove the protector 500, the pump unit 550 may be deactivated and the check valve 560 may be returned to the second configuration. Fluid may then enter the inner cavity 540 through the check valve 560, allowing a pressure difference between the inner cavity 540 and the region outside the inner cavity 540 to be equalized. Thereby, the force securing the protector 500 to the elongate member may be reduced, facilitating removal of the protector 500. In an embodiment, the check valve 560 may be switched between the first and the second configurations by means of a valve actuator, such as a handle. When the handle is moved in a first direction (e.g. pushed by a user), the check valve 560 may be switched to the first configuration, and the pump unit 550 may be actuated, causing a net removal of fluid from the inner cavity 540 and thereby establishing a pressure difference between the inner cavity 540 and the region outside the inner cavity 540, securing the protector 500 to the elongate member. When the handle is subsequently moved in a second direction (e.g. pulled by a user), the check valve 560 may be switched to the second configuration and the pump unit 550 may be deactivated, causing the pressure difference to equalize and facilitating the removal of the protector 500 from the elongate member. One or more additional handles may be provided on the cover portion of the protector 500.

In an embodiment, the protector 500 may be a protector according to the first embodiment of the invention. That is, the features explained above with reference to FIG. 15 may be incorporated in the embodiment of FIG. 1.

The invention claimed is:

1. A protector for an elongate member, the protector comprising:
   a rigid portion formed from a first material having a first elastic modulus, having a body portion defining a central axis and for axial insertion into a cavity defined by an end portion of the elongate member;
   a cover portion extending from the body portion; and
   a flexible portion formed from a second material having a second elastic modulus and provided on an outer surface of the body portion, the second elastic modulus being smaller than the first elastic modulus,
   and
   wherein, as the body portion is received within the cavity of the elongate member, the flexible portion engages the inner surface of the cavity to form a seal between the body portion and the inner surface of the cavity, and the cover portion covers an end surface of the elongate member, and
   wherein the first material and second material are both plastics materials.

2. The protector of claim 1, further including a portion of the second material provided on a surface of the cover portion for providing a cushion between the cover portion and the end of the elongate member.

3. The protector of claim 1, wherein the protector is circularly symmetric about the central axis.

4. The protector of claim 1, wherein each first ridge is non-helical.

5. The protector of claim 1, further comprising:
   a check valve provided within the rigid portion, the check valve being switchable between a first configuration and a second configuration;
   wherein, when the body portion is received within the cavity of the elongate member:
   in a first configuration, the check valve selectively allows fluid communication from the cavity to a region outside the cavity, but selectively blocks fluid communication from the region to the cavity, and
   in a second configuration, the check valve allows two-way fluid communication between the region and the cavity.

6. The protector of claim 5, further comprising a pump for removing fluid from the cavity of the elongate member, and a valve actuator for switching the check valve between the first configuration and the second configuration.

7. The protector of claim 6, wherein the valve actuator comprises a handle,
   wherein, when the handle is moved in a first direction, the pump is actuated and the check valve is switched to the first configuration,
   and when the handle is moved in a second direction, the check valve is switched to the second configuration, causing a pressure inside the cavity to equalize with a pressure outside the cavity.

8. The protector of claim 5, further comprising a flexible wall, the flexible wall and an inner surface of the body portion defining an inner cavity therebetween;
   wherein, in the first configuration, the check valve selectively allows fluid communication from the inner cavity to a region outside the inner cavity, but selectively blocks fluid communication from the region to the inner cavity, and
   in the second configuration, the check valve allows two-way fluid communication between the region and the inner cavity.

9. The protector of claim 1, wherein the cover portion extends over a portion of an outer surface of the elongate member when the body portion is received within the cavity.

10. The protector of claim 1, further comprising a chip, located within the rigid portion, having a memory for storing information regarding at least one property of the protector.

11. The protector of claim 1, wherein the flexible portion has one or more resilient members comprising one or more first flexible ridges.

12. The protector of claim 1, wherein the flexible portion includes a plurality of flexible legs configured to secure the flexible portion to the body portion.

13. The protector of claim 12, in which the plurality of flexible legs are spaced in an equidistant fashion about the central axis of the body portion.

14. A method for manufacturing a protector, the protector comprising:

a rigid portion formed from a first material having a first elastic modulus, having a body portion defining a central axis and for axial insertion into a cavity defined by an end portion of the elongate member;

a cover portion extending from the body portion; and a flexible portion formed from a second material having a second elastic modulus and provided on an outer surface of the body portion, the second elastic modulus being smaller than the first elastic modulus, wherein, as the body portion is received within the cavity of the elongate member, the flexible portion engages the inner surface of the cavity to form a seal between the body portion and the inner surface of the cavity, and the cover portion covers an end surface of the elongate member, and, wherein the first and second materials are both plastics materials, the method comprising the steps of:

providing the first and second materials in a liquid state;

injecting the first and second materials into a mould;

forming the rigid portion from the first material; and forming the flexible portion from the second material.

15. A method of applying a protector to a non-threaded pipe, the protector comprising:

a rigid portion formed from a first material having a first elastic modulus, having a body portion defining a central axis and for axial insertion into a cavity defined by an end portion of the non-threaded pipe;

a cover portion extending from the body portion; and a flexible portion formed from a second material having a second elastic modulus and provided on an outer surface of the body portion, the second elastic modulus being smaller than the first elastic modulus, wherein the first and second materials are both plastic materials; and the method comprising inserting the body portion of the protector into the cavity of the non-threaded pipe, whereby the flexible portion engages the inner surface of the cavity to form a seal between the body portion and the inner surface of the cavity, and the cover portion covers an end surface of the elongate member.

\* \* \* \* \*